United States Patent
Liu et al.

(10) Patent No.: US 11,208,356 B2
(45) Date of Patent: Dec. 28, 2021

(54) GOLDEN CERAMIC, METHOD FOR PREPARING SAME AND CERAMIC HOUSING

(71) Applicant: BEIJING XIAOMI MOBILE SOFTWARE CO., LTD., Beijing (CN)

(72) Inventors: Jihong Liu, Beijing (CN); Zhongshan Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/695,116

(22) Filed: Nov. 25, 2019

(65) Prior Publication Data

US 2021/0053879 A1    Feb. 25, 2021

(30) Foreign Application Priority Data

Aug. 21, 2019  (CN) .......................... 201910773707.9

(51) Int. Cl.
- *C04B 35/488*  (2006.01)
- *C04B 35/64*  (2006.01)
- *C04B 35/638*  (2006.01)
- *C04B 35/626*  (2006.01)

(52) U.S. Cl.
CPC ........ *C04B 35/488* (2013.01); *C04B 35/6265* (2013.01); *C04B 35/638* (2013.01); *C04B 35/64* (2013.01); *C04B 2235/3224* (2013.01); *C04B 2235/3225* (2013.01); *C04B 2235/3244* (2013.01); *C04B 2235/3272* (2013.01); *C04B 2235/3886* (2013.01); *C04B 2235/5409* (2013.01); *C04B 2235/5445* (2013.01); *C04B 2235/6025* (2013.01); *C04B 2235/652* (2013.01); *C04B 2235/6567* (2013.01); *C04B 2235/6582* (2013.01); *C04B 2235/9661* (2013.01)

(58) Field of Classification Search
CPC . C04B 35/488; C04B 35/6265; C04B 35/638; C04B 35/64; C04B 2235/3224; C04B 2235/3225; C04B 2235/3244; C04B 2235/3272; C04B 2235/3886; C04B 2235/5409; C04B 2235/5445; C04B 2235/6025; C04B 2235/652; C04B 2235/6567; C04B 2235/6582; C04B 2235/9661

See application file for complete search history.

(56) References Cited

U.S. PATENT DOCUMENTS

| | | | | |
|---|---|---|---|---|
| 4,511,665 A | * | 4/1985 | Nagato | ............. C04B 35/58028 501/96.1 |
| 2013/0247388 A1 | * | 9/2013 | Kawasumi | ................ B26B 9/00 30/345 |

FOREIGN PATENT DOCUMENTS

| | | | | |
|---|---|---|---|---|
| CN | 106830931 | * | 6/2017 | ............. C04B 35/48 |
| CN | 106830931 A | | 6/2017 | |
| EP | 0947490 A1 | * | 10/1999 | ........... C04B 35/486 |
| EP | 0947490 A1 | | 10/1999 | |
| JP | H03242372 | * | 10/1991 | |
| JP | H03242372 A | | 10/1991 | |

OTHER PUBLICATIONS

Zelikman, A. N., O. E. Krein, and G. V. Samsonov. "Metallurgy of Rare Metals, Translated from Russian, Chapter V, Zirconium." (1964). (Year: 1964).*

Extended European search report of counterpart EP application No. 19214626.4 dated Jun. 8, 2020.

* cited by examiner

*Primary Examiner* — Karl E Group
*Assistant Examiner* — Cameron K Miller
(74) *Attorney, Agent, or Firm* — Syncoda LLC; Feng Ma

(57) ABSTRACT

A golden ceramic includes: a ceramic matrix in a weight percentage of 80-99% and a colorant in a weight percentage of 1-20%, wherein the ceramic matrix includes zirconium oxide and yttrium oxide, and the colorant includes zirconium nitride.

11 Claims, No Drawings

GOLDEN CERAMIC, METHOD FOR PREPARING SAME AND CERAMIC HOUSING

CROSS-REFERENCE TO RELATED APPLICATION

This application claims priority to Chinese Patent Application 201910773707.9, filed Aug. 21, 2019, the disclosure of which is hereby incorporated by reference in its entirety.

BACKGROUND

Due to its hardness, good strength and being scratch proof, ceramic is widely used. Moreover, it is warm in color and good in affinity with skin, and thus has become one of the ideal choices of housing materials for mobile terminals and other products. At present, the housings of many products are made of golden ceramic to cater to the consumers' preferences. The raw materials of a ceramic matrix are typically added with a colorant and then molded, going through debinding, and sintered to obtain the golden ceramic.

SUMMARY

The present disclosure relates generally to the field of ceramic technologies, and more specifically to a golden ceramic, a method for preparing same and a ceramic housing.

In an aspect, there is provided a golden ceramic, comprising: a ceramic matrix in a weight percentage of 80-99% and a colorant in a weight percentage of 1-20%, wherein the ceramic matrix comprises zirconium oxide and yttrium oxide, and the colorant comprises zirconium nitride.

In another aspect, there is provided a method for preparing a golden ceramic, comprising:
molding an oxide powder raw material to obtain a molded body;
debinding and sintering the molded body; and
subjecting the sintered body to reduction-nitridation reaction in an atmosphere of a reaction gas to obtain the golden ceramic, the reaction gas containing nitrogen,
wherein the oxide powder raw material comprises:
85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

In yet another aspect, there is provided a method for preparing a golden ceramic, comprising:
subjecting an oxide powder raw material to reduction-nitridation reaction;
molding the reduced-nitrided powder raw material to obtain a molded body; and
debinding and sintering the molded body to obtain the golden ceramic,
wherein the oxide powder raw material comprises:
85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

In yet another aspect, there is provided a ceramic housing, which is made of the golden ceramic described above; or, which is made of the golden ceramic prepared by the preparation method described above.

It is to be understood that both the foregoing general description and the following detailed description are exemplary and explanatory only and are not intended to limit the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

In some embodiments, there is provided a golden ceramic, comprising: a ceramic matrix in a weight percentage of 80-99% and a colorant in a weight percentage of 1-20%, wherein the ceramic matrix comprises zirconium oxide and yttrium oxide, and the colorant comprises zirconium nitride.

In some embodiments, the ceramic matrix further comprises hafnium oxide, and the colorant further comprises hafnium nitride.

In some embodiments, the zirconium oxide and the hafnium oxide constitute a weight percentage of 92-98% in the ceramic matrix, and a weight ratio of the zirconium oxide to the hafnium oxide is 98-99:2-1, and the yttrium oxide constitutes a weight percentage of 2%-8% in the ceramic matrix.

In some embodiments, the zirconium oxide and the hafnium oxide constitute a total weight percentage of 95-97% in the ceramic matrix, and the yttrium oxide constitutes a weight percentage of 3-5% in the ceramic matrix.

In some embodiments, the colorant further comprises at least one of titanium nitride, vanadium nitride, praseodymium oxide, and iron oxide.

In some embodiments, the ceramic matrix constitutes a weight percentage of 80-90%, and the colorant constitutes a weight percentage of 10-20%.

In some other embodiments, there is provided a method for preparing a golden ceramic, comprising:
molding an oxide powder raw material to obtain a molded body;
debinding and sintering the molded body; and
subjecting the sintered body to reduction-nitridation reaction in an atmosphere of a reaction gas to obtain the golden ceramic, the reaction gas containing nitrogen,
wherein the oxide powder raw material comprises:
85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

In some embodiments, the reaction gas is a mixed gas of nitrogen and hydrogen, or the reaction gas is a mixed gas of nitrogen and carbon monoxide.

In some embodiments, a molar ratio of the nitrogen to the hydrogen is 99-80:1-20 in the mixed gas of nitrogen and hydrogen; and a molar ratio of the nitrogen to the carbon monoxide is 99-99.9:1-0.1 in the mixed gas of nitrogen and carbon monoxide.

In some embodiments, the reduction-nitridation reaction has a reaction temperature of 1300-1600° C., with a heat holding time of 30-180 min.

In some embodiments, powder in the oxide powder raw material has a particle size distribution D50 of 0.2-0.5 μm, and a specific surface area of 8-12 m2/g.

In some embodiments, the molding comprises: dry pressing, isostatic pressing, tape casting, or injection molding.

In some embodiments, the debinding and sintering comprises: placing the molded body in a sintering furnace; heating to 550° C. gradually in 15-30 hr; then heating to 1350-1450° C. in 5-10 hr; and holding heat for 1-4 hr.

In yet some other embodiments, there is provided a method for preparing a golden ceramic, comprising:

subjecting an oxide powder raw material to reduction-nitridation reaction;

molding the reduced-nitrided powder raw material to obtain a molded body; and debinding and sintering the molded body to obtain the golden ceramic, wherein the oxide powder raw material comprises:

85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

In some embodiments, the subjecting an oxide powder raw material to reduction-nitridation reaction comprises:

calcining the oxide powder raw material in the presence of a reaction gas at a temperature of 1000-1400° C. to obtain the powder raw material with a gold tone, wherein the reaction gas is a mixed gas of nitrogen and hydrogen, or the reaction gas is a mixed gas of nitrogen and carbon monoxide.

In some embodiments, a molar ratio of the nitrogen to the hydrogen is 99-80:1-20 in the mixed gas of nitrogen and hydrogen; and a molar ratio of the nitrogen to the carbon monoxide is 99-99.9:0.1-1 in the mixed gas of nitrogen and carbon monoxide.

In some embodiments, powder in the powder raw material has a particle size distribution D50 of 0.2-0.5 μm, and a specific surface area of 8-12 m2/g.

In some embodiments, the debinding and sintering the molded body comprises:

placing the molded body in a debinding furnace, and heating to 350° C. in 10-30 hr; and transferring the molded body into an atmosphere furnace, heating to a temperature of 1350-1450° C. in 5-15 hr gradually in a nitrogen atmosphere for sintering, and holding heat for 2-4 hr.

In some embodiments, before subjecting the oxide powder raw material to reduction-nitridation reaction, the method further comprises:

compounding precursors corresponding to metal ions in the oxide powder raw material according to a ratio of metal ions in the oxide powder raw material;

generating a hydroxide by coprecipitation; and heating the hydroxide under the condition of a nitrogen-hydrogen mixed gas to obtain the oxide powder raw material.

In still yet some other embodiments, there is provided a ceramic housing, which is made of the golden ceramic described above; or, which is made of the golden ceramic prepared by the preparation method described above.

In the embodiments of the present disclosure, the colorant used in the golden ceramic includes zirconium nitride which has a golden color, and thus, a golden-tone ceramic may be obtained. Moreover, the ceramic matrix includes yttrium oxide and zirconium oxide, with the yttrium oxide acting as a stabilizer for the zirconium oxide; and by means of a phase-transition toughening and strengthening mechanism, the ceramic may be improved in strength and toughness to meet product requirements. Furthermore, with a nitride produced from reduction-nitridation reaction as the colorant of the ceramic in the embodiments of the present disclosure, the nitride may be evenly mixed with the ceramic matrix to obtain a ceramic with uniform color and high metallic luster.

An embodiment of the present disclosure provides a golden ceramic, including: a ceramic matrix in a weight percentage of 80-99% and a colorant in a weight percentage of 1-20%, wherein the ceramic matrix includes zirconium oxide and yttrium oxide, and the colorant includes zirconium nitride.

The colorant used in the golden ceramic includes zirconium nitride which has a gold color, and thus, a golden-tone ceramic may be obtained. Moreover, the ceramic matrix includes yttrium oxide and zirconium oxide, with the yttrium oxide acting as a stabilizer for the zirconium oxide; and by means of a phase-transition toughening and strengthening mechanism, the ceramic may be improved in strength and toughness to meet product requirements. Furthermore, with a nitride produced from reduction-nitridation reaction as the colorant of the ceramic in the embodiment of the present disclosure, the nitride may be evenly mixed with the ceramic matrix to obtain a ceramic with uniform color and high metallic luster.

Alternatively, the ceramic matrix further includes hafnium oxide, and the colorant further includes hafnium nitride. Since the ceramic contains hafnium oxide, it is possible to use a product without hafnium removed from a zirconia production process as a raw material, thereby reducing the production cost of the ceramic.

Alternatively, the zirconium oxide and the hafnium oxide constitute a weight percentage of 90-98% in the ceramic matrix, and a weight ratio of the zirconium oxide to the hafnium oxide is 98-99:2-1, and the yttrium oxide constitutes a weight percentage of 2%-8% in the ceramic matrix.

Alternatively, the zirconium oxide and the hafnium oxide constitute a total weight percentage of 95-97% in the ceramic matrix, and the yttrium oxide constitutes a weight percentage of 3-5% in the ceramic matrix.

At this ratio, the golden ceramic has LAB values in the ranges of 30<L<80, 5<a<20, and 50<b<90, with uniform color and high metallic luster.

Alternatively, the colorant further includes at least one of titanium nitride, vanadium nitride, praseodymium oxide, and iron oxide. Among them, in addition to changing the color of the ceramic, titanium nitride may also lower the sintering temperature and concurrently lead to a decrease in fracture toughness. Vanadium nitride may increase the hardness of the ceramic, decrease the L-value, increase the b-value slightly, and increase the a-value; the praseodymium oxide may be added to keep the a-value unchanged, and increase the L-value and the b-value; and the iron oxide may be added to increase the a-value and b-value and reduce the L-value.

Alternatively, the ceramic matrix constitutes a weight percentage of 80-90%, and the colorant constitutes a weight percentage of 10-20%.

An embodiment of the present disclosure further provides a method for preparing a golden ceramic, including:

molding an oxide powder raw material to obtain a molded body;

debinding and sintering the molded body; and subjecting the sintered body to reduction-nitridation reaction in an atmosphere of a reaction gas to obtain the golden ceramic, the reaction gas containing nitrogen, wherein the oxide powder raw material includes:

85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

Since the nitridation occurs difficultly, most of the oxides in the molded body are sintered to form the ceramic matrix during the debinding and sintering, and a small amount of oxides are nitrided to become a nitride colorant, which is evenly mixed in the ceramic matrix to change the overall color of the ceramic, thereby obtaining the golden ceramic. The ceramic obtained with this method has uniform color and high metallic luster.

Alternatively, the molding includes dry pressing, isostatic pressing, tape casting, or injection molding.

Illustratively, the dry pressing includes: after grinding and dispersing the oxide powder raw material, adding a binder and a solvent, and then performing spray-granulation to form spherical/near-spherical shape granulated spheres having a particle diameter of 50-120 μm; dry-pressing the granulated spheres in a preset mold under a dry-pressing pressure of 15-50 MPa, which is held for 1-3 s; then transferring to an isostatic press, and pressing the spheres under 120-200 Mpa for 60-180 s; and demolding to obtain a molded body.

In the dry pressing, the binder may be PVA (polyvinyl alcohol), PEG (polyethylene glycol), PMMA (polymethyl methacrylate) or PVP (polyvinyl pyrrolidone), and the solvent may be water.

Illustratively, the isostatic pressing includes: after grinding and dispersing the oxide powder raw material, adding a binder and a solvent, and then performing spray-granulation to obtain dry-pressed powder; placing the dry-pressed powder in a preset rubber mold and then placing the mold in the isostatic press to perform isostatic pressing under 120-200 MPa, which is held for 3-90 s; and demolding to obtain a molded body.

In the isostatic pressing, the binder may be PVA, PEG, PMMA or PVP, and the solvent may be water.

Illustratively, the tape casting includes: taking 45-60% by weight of the oxide powder raw material, 3.5-7% by weight of the binder, 0.1-0.5% by weight of a dispersant, 1.5-3.5% by weight of a plasticizer, and the balance of solvent; preparing them into tape casting slurry by a sanding mill; defoaming the slurry to achieve the viscosity of 1600±200 CPS; tape-casting the defoamed slurry into a film tape having a thickness of 280±15 μm; cutting the film tape to a preset size and shape; overlapping four layers of the cut film tapes and placing them on a mold having a preset shape for vacuum encapsulation; and then pressurizing them to 150 MPa in an isostatic press at 75° C., and holding the pressure for 90 s, thereby obtaining a molded body.

In the tape casting, the binder is polyvinyl butyral; the dispersant is an ester dispersant; the plasticizer is dioctyl phthalate; and the solvent is ethanol or an ether solvent.

Illustratively, the injection molding includes: taking 83-89.6 wt % of the oxide powder raw material, 10-16 wt % of the binder, 0.2-0.5 wt % of the dispersant, and 0.2-0.5 wt % of the plasticizer; mixing the oxide powder raw material with the binder, the dispersant and the plasticizer through a mixing machine for granulation; performing injection molding to achieve a preset shape and size for obtaining a molded body; and then degreasing the molded body with a solvent or thermally to obtain a body.

In the injection molding, the binder may be one or more of PE (polyethylene), PP (polypropylene), PS (polystyrene), PPS (polyphenylene sulfide), PMMA, EVA (ethylene vinyl acetate copolymer), EVS, POM (polyoxymethylene), and polyethylene wax; and the dispersant may be one or more of titanate, stearic acid, and oleic acid.

Alternatively, the debinding and sintering includes: placing the molded body in a sintering furnace; heating to 550° C. gradually in 15-30 hr; then heating to 1350-1450° C. in 5-10 hr; and holding heat for 1-4 hr. Here, the holding heat for 1-4 hr means holding the heat at the highest sintering temperature for 1-4 hr. For example, the heating is stopped after the temperature is raised to 1400° C., which is held for 1-4 hr. In this method, the debinding and sintering may be carried out in an air atmosphere.

Illustratively, in the debinding phase, i.e., during the temperature rise to 550° C., the heating rate is lower than 5° C./min; and in the sintering phase, i.e., during the temperature rise to 1350-1450° C., the heating rate is lower than 10° C./min.

Alternatively, during the temperature rise, it is also possible to stay at some temperature points for a period of time. The temperature points and stay time may be adjusted according to actual needs as long as the effect of debinding or sintering can be achieved, which are not limited in the present disclosure.

Alternatively, the reaction gas is a mixed gas of nitrogen and hydrogen, or the reaction gas is a mixed gas of nitrogen and carbon monoxide.

Alternatively, a molar ratio of the nitrogen to the hydrogen is 99-80:1-20 in the mixed gas of nitrogen and hydrogen; and a molar ratio of the nitrogen to the carbon monoxide is 99-99.9:0.1-1 in the mixed gas of nitrogen and carbon monoxide. With the mixed gas at this ratio, it is beneficial to the reduction-nitridation reaction.

Alternatively, the reduction-nitridation reaction has a reaction temperature of 1300-1600° C., with a heat holding time of 30-180 min.

Alternatively, the reduction-nitridation reaction has a reaction temperature of 1400-1500° C., with a heat holding time of 30-180 min.

It should be noted that during the reduction-nitridation reaction, the amount of nitrided oxides increases as the molar ratio of nitrogen to other gases in the reducing gas increases.

Alternatively, powder in the oxide powder raw material has a particle size distribution D50 of 0.2-0.5 μm, and has a specific surface area of 8-12 m$^2$/g.

Alternatively, the preparation method may further include: preparing an oxide powder raw material. Alternatively, any one of a coprecipitation method, a hydrolysis method, a hydrothermal method, a sol-gel method, and an explosion combustion method may be used.

In another aspect, there is provided a method for preparing a golden ceramic, including:

subjecting an oxide powder raw material to reduction-nitridation reaction;

molding the reduced-nitrided powder raw material to obtain a molded body; and debinding and sintering the molded body to obtain the golden ceramic, wherein the oxide powder raw material includes:

85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

Alternatively, the subjecting an oxide powder raw material to reduction-nitridation reaction includes:

calcining the oxide powder raw material in the presence of a reaction gas at a temperature of 1000-1400° C. to obtain a golden powder raw material, wherein the reaction gas is a mixed gas of nitrogen and hydrogen, or the reaction gas is a mixed gas of nitrogen and carbon monoxide.

After calcining at a high temperature, some of the oxide powder raw material are nitrided into golden nitride powder, which is uniformly mixed with the non-nitrided oxide powder to obtain a uniformly mixed powder raw material having a gold color on the whole.

Alternatively, a molar ratio of the nitrogen to the hydrogen is 99-80:1-20 in the mixed gas of nitrogen and hydrogen; and a molar ratio of the nitrogen to the carbon monoxide is 99-99.9:0.1-1 in the mixed gas of nitrogen and carbon monoxide.

Alternatively, powder in the powder raw material has a particle size distribution D50 of 0.2-0.5 μm and a specific surface area of 8-12 $m^2/g$.

Alternatively, the debinding and sintering the molded body includes:

placing the molded body in a debinding furnace, and heating to 350° C. in 10-30 hr; and transferring the molded body into an atmosphere furnace, heating to a temperature of 1350-1450° C. in 5-15 hr gradually under a nitrogen atmosphere for sintering, and holding heat for 2-4 hr. Here, the holding heat for 2-4 hr means holding the heat at the highest sintering temperature for 1-4 hr. For example, the heating is stopped after the temperature is raised to 1400° C., which is held for 2-4 hr.

The debinding is first conducted in the air atmosphere of the debinding furnace to speed up the debinding, and then the molded body is transferred to the atmosphere furnace and sintered under the protection of a nitrogen atmosphere to prevent the nitride in the molded body from being oxidized.

Illustratively, the temperature rise rate in the debinding furnace is below 5° C./min and the temperature rise rate in the atmosphere furnace is below 10° C./min.

Alternatively, during the temperature rise, it is also possible to stay at some temperature points for a period of time. The temperature points and stay time may be adjusted according to actual needs as long as the effect of debinding or sintering can be achieved, which are not limited in the present disclosure.

Alternatively, before subjecting the oxide powder raw material to the reduction-nitridation reaction, the method further includes:

compounding precursors corresponding to metal ions in the oxide powder raw material according to the ratio of metal ions in the oxide powder raw material;

generating a hydroxide by coprecipitation; and heating the hydroxide under the condition of a nitrogen-hydrogen mixed gas to obtain the oxide powder raw material.

Among them, the heating the hydroxide under the condition of a nitrogen-hydrogen mixed gas to obtain the oxide powder raw material may be performed under the same condition as that of the reduction-nitridation reaction.

In the related art, in order to obtain the golden ceramic, it is general to add the colorant made of other materials into the raw materials of the ceramic matrix, and then perform molding, debinding and sintering. In the embodiments of the present disclosure, the nitride as the colorant is obtained by nitriding the oxide in the ceramic matrix raw material, that is, the ceramic matrix and the colorant are formed from the same raw material, so that the prepared ceramic may be more uniform in color.

Embodiment 1

1) Oxide Powder Raw Material:

Zirconium oxide: 95.3 wt %; yttrium oxide: 2.7 wt %; hafnium oxide: 1.6 wt %; and titanium oxide: 0.4 wt %.

The powder has a particle size distribution D50 of 320 nm and a specific surface area of 9.4 $m^2/g$.

2) Molding:

Take 50% by weight of the oxide powder raw material, 4.1% by weight of the binder, 0.4% by weight of a dispersant, 2.0% by weight of a plasticizer, and 43.5% by weight of a solvent; prepare them into tape casting slurry by a sanding mill; defoam the slurry to achieve the viscosity of 1600±200 CPS; tape-cast the defoamed slurry into a film tape having a thickness of 280±15 μm; cut the film tape to a preset size and shape; overlap four layers of the cut film tapes and place them on a mold having a preset shape for vacuum encapsulation; and then pressurize them to 150 MPa in an isostatic press at 75° C., and hold the pressure for 90 s, thereby obtaining a molded body.

Among them, the binder is polyvinyl butyral; the dispersant is an ester dispersant; the plasticizer is dioctyl phthalate; and the solvent is ethanol.

3) Debinding and Sintering:

Place the molded body in a sintering furnace for debinding and sintering, where the debinding temperature was 1430° C., which was held for 2 hours.

4) Reduction-Nitridation Reaction:

Place the sintered body in an atmosphere furnace; and heat the sintered body to 1400° C. in an atmosphere of a mixed gas of nitrogen and hydrogen, which was held for 120 min for reduction-nitridation reaction, thereby obtaining a golden ceramic, where a molar ratio of the nitrogen to the hydrogen was 98:2.

Embodiment 2

1) Oxide Powder Raw Material:

Zirconium dioxide: 85 wt %; hafnium oxide: 2.0 wt %; titanium oxide: 2.0 wt %; yttrium oxide: 4.5 wt %; iron oxide: 0.5 wt %; praseodymium oxide: 5.0 wt %; and vanadium oxide: 1.0 wt %.

The powder has a particle size distribution D50 of 500 nm and a specific surface area of 8 $m^2/g$.

2) Same as Embodiment 1

3) Same as Embodiment 1

4) Reduction-Nitridation Reaction:

Place the sintered body in the atmosphere furnace; and heat the sintered body to 1300° C. in an atmosphere of a mixed gas of nitrogen and hydrogen, which was held for 30 min for reduction-nitridation reaction, thereby obtaining a golden ceramic, where a molar ratio of the nitrogen to the hydrogen was 99:1.

Embodiment 3

1) Oxide Powder Raw Material:

Zirconium dioxide: 96 wt %; hafnium oxide: 1.0 wt %; titanium oxide: 0.2 wt %;

yttrium oxide: 2.0 wt %; and iron oxide: 0.8 wt %.

The powder has a particle size distribution D50 of 200 nm and a specific surface area of 12 $m^2/g$.

2) Same as Embodiment 1

3) Same as Embodiment 1

4) Reduction-Nitridation Reaction:

Place the sintered body in the atmosphere furnace; and heat the sintered body to 1600° C. in an atmosphere of a mixed gas of nitrogen and hydrogen, which was held for 180 min for reduction-nitridation reaction, thereby obtaining a golden ceramic, where a molar ratio of the nitrogen to the hydrogen was 80:20.

Embodiment 4

1) Oxide Powder Raw Material:
Zirconium dioxide: 96 wt %; hafnium oxide: 1.0 wt %; titanium oxide: 0.2 wt %;
yttrium oxide: 2.0 wt %; and praseodymium oxide: 0.8 wt %.
The powder has a particle size distribution D50 of 500 nm and a specific surface area of 8 $m^2/g$.
2) Same as Embodiment 1
3) Same as Embodiment 1
4) Reduction-Nitridation Reaction:
Place the sintered body in the atmosphere furnace; and heat the sintered body to 1600° C. in an atmosphere of a mixed gas of nitrogen and carbon monoxide, which was held for 90 min for reduction-nitridation reaction, thereby obtaining a golden ceramic, where a molar ratio of the nitrogen to the carbon monoxide was 99:1.

Embodiment 5

1) Oxide Powder Raw Material:
Zirconium dioxide: 96 wt %; hafnium oxide: 1.0 wt %; titanium oxide: 0.2 wt %;
yttrium oxide: 2.0 wt %; and vanadium oxide: 0.8 wt %.
The powder has a particle size distribution D50 of 500 nm and a specific surface area of 8 $m^2/g$.
2) Same as Embodiment 1
3) Same as Embodiment 1
4) Reduction-Nitridation Reaction:
Place the sintered body in the atmosphere furnace; heat the sintered body to 1500° C. in an atmosphere of a mixed gas of nitrogen and carbon monoxide, where a molar ratio of the nitrogen to the carbon monoxide was 99.9:0.1; and hold the temperature for 120 min for reduction-nitridation reaction, thereby obtaining a golden ceramic.

Embodiment 6

Oxide Powder Raw Material:
Zirconium dioxide: 96 wt %; hafnium oxide: 1.0 wt %; titanium oxide: 0.2 wt %; yttrium oxide: 2.0 wt %; iron oxide: 0.4 wt %; and praseodymium oxide: 0.4 wt %.
The powder has a particle size distribution D50 of 500 nm and a specific surface area of 12 $m^2/g$.
2) Same as Embodiment 1
3) Same as Embodiment 1
4) Reduction-Nitridation Reaction:
Place the sintered body in the atmosphere furnace; and heat the sintered body to 1300° C. in an atmosphere of a mixed gas of nitrogen and carbon monoxide, which was held for 30 min for reduction-nitridation reaction, thereby obtaining a golden ceramic, where a molar ratio of the nitrogen to the carbon monoxide was 99.9:0.1.

Embodiment 7

1) Preparation of Oxide Powder Raw Material and Nitridation-Reduction;
Compound zirconium oxychloride, tetrabutyl titanate and yttrium nitrate according to an ion ratio of zirconium to titanium to yttrium, where the ion ratio is the same as the ratio of the metal ions in the following oxide powder: 95.1 wt % of zirconium oxide, 1.3 wt % of titanium oxide and 3.6 wt % of yttrium oxide; and perform coprecipitation to synthesize a hydroxide mixture containing a zirconium hydroxide, a titanium hydroxide and a yttrium hydroxide. The hydroxides had a grain size of 10-50 nm.
Dry the hydroxide mixture and place the same in the atmosphere furnace; charge a reaction gas to the atmosphere furnace; and heat to 1080° C. in 6 hr, which was held for 90 min, where the reaction gas was a mixed gas of nitrogen and hydrogen at a molar ratio of 99:1.
By grinding and dispersing, the powder raw material with the particle size distribution D50 of 430 nm and the specific surface area of 8.3 $m^2/g$ was obtained.
It should be noted that an associated hafnium element is generally present in the zirconium oxychloride, i.e., the precursor of zirconium, therefore, the powder raw material obtained may also include hafnium nitride and hafnium oxide. Of course, if the precursor does not contain the associated hafnium element, the powder raw material obtained does not contain the hafnium nitride and hafnium oxide.
2) Molding: Take 55% by weight of the powder raw material, 1.5% by weight of the binder and 43.5% by weight of the solvent; mix them by a stirring sanding mill to prepare slurry; defoam the slurry, and spray-granulate the defoamed slurry into granulated powder with the average particle size of 85 μm; dry-press the granulated powder in a preset mold under the pressure of 25 MPa, which was held for 2 s; take out the dry-pressed powder for vacuum encapsulation; and place the vacuum-encapsulated powder in the isostatic press under the isostatic pressure of 180 MPa, which was held for 150 s, thereby obtaining the molded body.
Among them, the binder may be polyvinyl pyrrolidone, and the solvent may be water.
3) Debinding and Sintering:
Place the molded body in the debinding furnace; heat the furnace to 350° C. in 10 hr, which was held for 5 hours; then transfer the heated molded body into the atmosphere furnace, into which nitrogen was charged; and heat the atmosphere furnace to 1420° C. in 8 hours, which was held for 3 hours, thereby obtaining the golden ceramic.

Embodiment 8

1) Reduction-Nitridation Reaction of Oxide Powder Raw Material;
Place the oxide powder raw material including 85 wt % of zirconium dioxide, 2.0 wt % of hafnium oxide, 2.0 wt % of titanium oxide, 4.5 wt % of yttrium oxide, 0.5 wt % of iron oxide, 5.0 wt % of praseodymium oxide and 1.0 wt % of vanadium oxide into the atmosphere furnace, into which a reaction gas was charged, and heat the atmosphere furnace to 1000° C. in 6 hr, which was held for 30 min, where the reaction gas was a mixed gas of nitrogen and hydrogen at a molar ratio of 80:20.
By grinding and dispersing, the powder with the particle size distribution D50 of 200 nm and a specific surface area of 8 $m^2/g$ was obtained.
2) Same as Embodiment 7
3) Same as Embodiment 7

Embodiment 9

1) Reduction-Nitridation Reaction of Oxide Powder Raw Material;

Place the oxide powder raw material including 96 wt % of zirconium dioxide, 1.0 wt % of hafnium oxide, 2.0 wt % of titanium oxide, 2.0 wt % of yttrium oxide, and 0.8 wt % of iron oxide into the atmosphere furnace, into which a reaction gas was charged, and heat the atmosphere furnace to 1000° C. in 6 hr, which was held for 180 min, where the reaction gas was a mixed gas of nitrogen and carbon monoxide at a molar ratio of 99.5:0.5.

By grinding and dispersing, the powder with the particle size distribution D50 of 500 nm and a specific surface area of 12 m²/g was obtained.

2) Same as Embodiment 7
3) Same as Embodiment 7

TABLE 1

Properties of golden ceramic for Embodiments 1-10

| | Bending strength (Mpa) | Fracture toughness (Mpa·m$^{1/2}$) | L-value | A-value | B-value | Hardness value (kgf/mm²) |
|---|---|---|---|---|---|---|
| 1 | 1160 | 6.8 | 63 | 5.8 | 67 | 1245 |
| 2 | 890 | 5.2 | 57 | 6.7 | 87 | 1238 |
| 3 | 1078 | 7.2 | 52 | 8.3 | 78 | 1389 |
| 4 | 1120 | 7.0 | 78 | 5.9 | 80 | 1327 |
| 5 | 1078 | 6.8 | 63 | 14 | 54 | 1412 |
| 6 | 1173 | 6.7 | 56 | 7.2 | 73 | 1217 |
| 7 | 1235 | 6.2 | 83 | 7.4 | 68 | 1255 |
| 8 | 1017 | 5.3 | 69 | 10.6 | 75 | 1423 |
| 9 | 1129 | 7.0 | 78 | 11.9 | 72 | 1329 |
| 10 | 1276 | 6.9 | 86 | 5.4 | 83 | 1274 |

TABLE 2

Composition of golden ceramic for Embodiments 1-10

| Zirconium oxide | Hafnium oxide | Yttrium oxide | Titanium nitride | Zirconium nitride | Hafnium nitride | Iron oxide | Praseodymium oxide | Vanadium nitride |
|---|---|---|---|---|---|---|---|---|
| 85.6 | 1.4 | 2.7 | 0.4 | 9.7 | 0.2 | 0 | 0 | 0 |
| 80.4 | 1.2 | 4.5 | 2.0 | 4.6 | 0.8 | 0.5 | 5.0 | 1.0 |
| 83.5 | 0.9 | 2.0 | 0.2 | 12.5 | 0.1 | 0.8 | 0 | 0 |
| 84.7 | 0.8 | 2.0 | 0.2 | 11.3 | 0.2 | 0 | 0.8 | 0 |
| 82.7 | 0.7 | 2.0 | 0.2 | 13.3 | 0.3 | 0 | 0 | 0.8 |
| 85.2 | 0.7 | 2.0 | 0.2 | 10.8 | 0.3 | 0.4 | 0.4 | 0 |
| 76.2 | 0 | 3.6 | 1.3 | 18.9 | 0 | 0 | 0 | 0 |
| 72.6 | 0.8 | 4.5 | 2.0 | 12.4 | 1.2 | 0.5 | 5.0 | 1.0 |
| 78.8 | 0.7 | 2.0 | 0 | 17.2 | 0.3 | 0.8 | 0 | 0 |
| 80.7 | 0.4 | 2.0 | 0.2 | 15.3 | 0.6 | 0 | 0.8 | 0 |

Embodiment 10

1) Reduction-Nitridation Reaction of Oxide Powder Raw Material:

Place the oxide powder raw material including 96 wt % of zirconium dioxide, 1.0 wt % of hafnium oxide, 2.0 wt % of titanium oxide, 2.0 wt % of yttrium oxide, and 0.8 wt % of praseodymium oxide into the atmosphere furnace, into which a reaction gas was charged, and heat the atmosphere furnace to 1080° C. in 6 hr, which was held for 90 min, where the reaction gas was a mixed gas of nitrogen and carbon monoxide at a molar ratio of 99.9:0.1.

By grinding and dispersing, the powder with the particle size distribution D50 of 430 nm and a specific surface area of 8.3 m²/g was obtained.

2) Same as Embodiment 7
3) Same as Embodiment 7

The golden ceramic obtained from the embodiments above were machined by 0.1-0.3 mm at upper and lower sides through CNC machining into finished products with a preset shape and size; and the finished products were polished and coated to obtain housings. The housings were tested in bending strength, fracture toughness, LAB chromatic values and hardness value to obtain the data shown in Table 1. Among them, the bending strength of the housings was measured with a four-point bending method, the fracture toughness was measured with a single-edge notched beam method, and the LAB values were measured using a colorimeter. The hardness value was measured using a Vickers hardness tester.

From Table 1 and Table 2, it can be seen that the golden ceramic prepared by the methods provided by the embodiments of the present disclosure has the bending strength of greater than 800 MPa, the fracture toughness of greater than 5 MPa·m$^{1/2}$, the hardness value of greater than 1200 kgf/mm², and the Lab values having the ranges of 30<L<80, 5<a<20 and 50<b<90, and may meet the product requirements. Furthermore, compared with the golden ceramic prepared by the method of first sintering and then reducing-nitriding (Embodiments 1-6), the golden ceramic prepared by the method of first reducing-nitriding and then sintering (Embodiments 7-10) is lower in grain size, slightly higher in general fracture toughness, and comparable in properties such as strength and hardness.

An embodiment of the present disclosure also provides a ceramic housing, which is made of the foregoing golden ceramic; or, which is made of the golden ceramic prepared according to the foregoing preparation method.

Illustratively, the ceramic housing may be a housing of an electronic terminal device, such as a housing of a mobile phone, a housing of a tablet computer, a housing of an electronic reader, a housing of a wearable device (e.g., a housing or dial of a smart watch), and the like.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for preparing a golden ceramic, comprising:
   molding an oxide powder raw material to obtain a molded body;
   debinding and sintering the molded body; and
   subjecting the sintered body to reduction-nitridation reaction in an atmosphere of a reactant gas to obtain the golden ceramic, the reaction gas containing nitrogen, wherein the reduction-nitridation reaction has a reaction temperature of 1300-1600° C., with a holding time of 30-180 min,
   wherein the oxide powder raw material comprises:
   85-96 wt % of zirconium oxide, 2.0-4.5 wt % of yttrium oxide, 0-2.0 wt % of hafnium oxide, 0-2.0 wt % of titanium oxide, 0-1.0 wt % of vanadium oxide, 0-5.0 wt % of praseodymium oxide, and 0-0.5 wt % of iron oxide.

2. The method according to claim 1, wherein the reaction gas is a mixed gas of nitrogen and hydrogen, or the reaction gas is a mixed gas of nitrogen and carbon monoxide.

3. The method according to claim 2, wherein a molar ratio of the nitrogen to the hydrogen is 99-80:1-20 in the mixed gas of nitrogen and hydrogen; or
   a molar ratio of the nitrogen to the carbon monoxide is 99-99.9:0.1-1 in the mixed gas of nitrogen and carbon monoxide.

4. The method according to claim 1, wherein powder in the oxide powder raw material has a particle size distribution D50 of 0.2-0.5 μm, and a specific surface area of 8-12 m2/g.

5. The method according to claim 1, wherein the molding is dry pressing, isostatic pressing, tape casting, or injection molding.

6. The method according to claim 1, wherein the debinding and sintering the molded body comprises: placing the molded body in a sintering furnace; gradually heating the body to 550° C. in 15-30 hr; then heating the body to a temperature of 1350-1450° C. in 5-10 hr; and holding the temperature of 1350-1450° C. for 1-4 hr.

7. A golden ceramic prepared by the method according to claim 1.

8. A ceramic housing composed of the golden ceramic according to claim 7.

9. The method according to claim 1, wherein the oxide powder raw material comprises: 1.0-2.0 wt % of hafnium oxide.

10. The method according to claim 1, wherein the oxide powder raw material comprises: 0.2-2.0 wt % of titanium oxide.

11. The method according to claim 1, wherein the oxide powder raw material comprises:
    hafnium oxide which is greater than 0 and is less than or equal to 2.0 wt %;
    titanium oxide which is greater than 0 and is less than or equal to 2.0 wt %;
    vanadium oxide which is greater than 0 and is less than or equal to 1.0 wt %;
    praseodymium oxide which is greater than 0 and is less than or equal to 5.0 wt %;
    iron oxide which is greater than 0 and is less than or equal to 0.5 wt %.

* * * * *